United States Patent [19]

Campbell, Jr. et al.

[11] Patent Number: 5,196,490
[45] Date of Patent: Mar. 23, 1993

[54] PROCESS FOR PREPARATION OF SYNDIOTACTIC POLYSTYRENE

[75] Inventors: Richard E. Campbell, Jr., Midland, Mich.; John G. Hefner, Lake Jackson, Tex.

[73] Assignee: The Dow Chemical Company, Midland, Mich.

[21] Appl. No.: 711,241

[22] Filed: Jun. 6, 1991

Related U.S. Application Data

[62] Division of Ser. No. 462,861 Jan. 5, 1990, Pat. No. 5,045,517, which is a continuation of Ser. No. 64,282, Jun. 17, 1987, abandoned.

[51] Int. Cl.$^5$ .......................... C08F 4/64; C08F 12/08
[52] U.S. Cl. .................................. 526/160; 526/159; 526/347.2

[58] Field of Search ...................... 526/160, 159, 347.2

[56] References Cited

U.S. PATENT DOCUMENTS 3,306,919 2/1967 Brantley et al. ................ 526/160 X
4,680,353 7/1987 Ishihara ............................... 526/160

Primary Examiner—Fred Teskin

[57] ABSTRACT

Syndiotactic polymers of vinyl aromatic monomers are prepared by conducting the polymerization in the presence of a catalytic amount of the reaction product of polymethylaluminoxane and a cyclopentadienyl/titanium complex.

7 Claims, No Drawings

PROCESS FOR PREPARATION OF SYNDIOTACTIC POLYSTYRENE

Cross-Reference to Related Application. This is a divisional of application Ser. No. 462,861 filed Jan. 5, 1990, now U.S. Pat. No. 5,045,517, which was a continuation of U.S. Ser. No. 64,282, filed Jun. 17, 1987, now abandoned.

FIELD OF THE INVENTION

The present invention pertains to a catalyst and a process for polymerizing vinyl aromatic monomers, particularly styrene, to produce syndiotactic polymers.

BACKGROUND OF THE INVENTION

It has recently been reported by N. Ishihara, T. Seimiya, M. Kuramoto and M. Uoi in "Crystalline Syndiotactic Polystyrene", Macromolecules, pp 2164–5, (1986) that syndiotactic polystyrene having high stereo regularity had been prepared in the presence of a titanium compound and an organoaluminum compound.

In EPO 210,615 syndiotactic polystyrene polymers were prepared utilizing titanium tetraethoxide, and cyclopentadienyltitanium trichloride complexes in combination with a polymethylaluminoxane cocatalyst.

SUMMARY OF THE INVENTION

According to the present invention there is now provided a novel catalyst comprising the reaction product of polymethylaluminoxane and a titanium (IV) complex corresponding to the formula: $CpTiX_3$, wherein Cp is a n-bonded cyclopentadienyl group, a n-bonded substituted or multiply substituted cyclopentadienyl group or a n-bonded monovalent oligomer of cyclopentadiene and X is independently each occurrence halide, OR, or $NR_2$, wherein R is independently each occurrence an aliphatic, cycloaliphatic or aromatic hydrocarbon group having from 1 to about 12 carbon atoms and provided further that in at least one occurrence X is OR or $NR_2$. By the term aromatic is included both substituted and unsubstituted aryl groups. Most suitably X is in each occurrence OR and R is selected from the group consisting of phenyl, and $C_{1-6}$ alkyl or cycloalkyl. In a preferred embodiment X is in each occurrence phenoxy.

The catalyst is normally formed in the presence of an aliphatic, cycloaliphatic or aromatic solvent or a combination of such solvents. The components are employed in quantities which provide an atomic ratio of Al:Ti suitably from about 10:1 to about 50,000:1, more suitably from about 50:1 to about 10,000:1, most suitably from about 100:1 to about 1000:1.

Another aspect of the present invention pertains to a process for preparing syndiotactic polymers of vinyl aromatic monomers which process comprises contacting at least one polymerizable vinyl aromatic monomer under polymerization conditions in the presence of the previously disclosed catalyst. As used herein, the term "syndiotactic" refers to such polymers having a stereo regular structure of greater than 50% syndiotactic as determined by C13 nuclear magnetic resonance spectroscopy. Such polymers may be usefully employed in the preparation of articles and objects (e.g., via compression molding or other suitable technique) having an extremely high resistance to deformation due to the effects of temperature. Compared to processes employing cyclopentadienyltitanium trichloride containing catalysts, the present invention achieves improved yields.

DETAILED DESCRIPTION OF THE INVENTION

The polymethylaluminoxane may be prepared according to any known technique. One such technique includes the reaction of trimethylaluminum and a hydrated metal salt as disclosed by Kaminsky in U.S. Pat. No. 4,544,762, the teachings of which are herein incorporated in their entirety by reference thereto. For purposes of calculating the molar ratio of aluminum:titanium in the catalysts of the present invention, the polymethylaluminoxane is assigned a repeating unit structure corresponding to the formula: $(Al(CH3)O)$.

Following preparation of polymethylaluminoxane a cyclopentadienyltitanium complex, as previously defined, is added to the polymethylaluminoxane along with additional diluent if desired. In addition to unsubstituted cyclopentadienyl derivatives, the metal complexes employed to prepare the catalysts of the present invention illustratively include cyclopentadienyl derivatives containing from 1 to 5 alkyl, aryl or silyl substituents having up to 18 carbons, eg., pentamethylcyclopentadienyl derivatives, penta(trimethylsilyl)cyclopentadienyl derivatives, etc. and ring fused derivatives such as indenyl titanium complexes and substituted indenyl titanium complexes. It is understood that the complex may be employed in the form of a precursor that is capable of generating the desired cyclopentadienyl/titanium complex in situ. An example includes such complexes additionally incorporating one or more molecules of any nature in the crystal structure, such as alcohol molecules associated with the crystal structure via Van der Waals forces. In the preparation of the catalyst composition, the cyclopentadienyl/titanium complex and the polymethylaluminoxane can be combined in any order. The catalyst components may be suitably mixed in an inert atmosphere such as nitrogen, argon, xenon, or combinations thereof. The components are mixed at any suitable temperature, preferably from about 0° C. to about 50° C., more suitably about 25° C.

The polymerization is conducted at temperatures of from about 25° C. to about 100° C., preferably from about 30° C. to about 60° C., for a time sufficient to produce the desired polymer. Typical reaction times are from several minutes to several hours, preferably from about 1 to about 10 hours. The optimum time will vary depending upon the temperature, solvent and other reaction conditions employed. The polymerization is generally conducted under slurry polymerization conditions.

The polymerization can be conducted at subatmospheric pressure as well as superatmospheric pressure, suitably at reduced pressures such that the lowest boiling component(s) of the polymerization mixture does not vaporize up to about 1000 psig. However, it is preferable that near atmospheric pressure be employed.

Suitable vinyl aromatic monomers which can be polymerized in the process of the present invention include those represented by the formula:

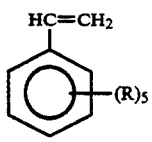

wherein each R is independently hydrogen, an aliphatic, cycloaliphatic or aromatic hydrocarbon group having suitably from 1 to about 10, more suitably from about 1 to about 6, most suitably from about 1 to about 4, carbon atoms: or a halogen atom. Suitably such monomers include, for example styrene, chlorostyrene, n-butyl styrene, etc. with styrene being especially suitable.

The polymerization is normally conducted in the presence of an inert diluent. Examples include aliphatic, cycloaliphatic, aromatic and halogenated aromatic hydrocarbons, as well as mixtures thereof. Preferred diluents comprise the $C_{4-20}$ alkanes, especially branched chain alkanes, toluene and mixtures thereof. A particularly desirable diluent for the polymerization is isooctane, or blends thereof such as Isopar-E ®, available from Exxon. Suitable amounts of solvent are employed to provide a monomer concentration from about 5% to about 100% by weight. During the polymerization, polymer may precipitate from the reaction mixture as it is formed.

As in other similar polymerizations it is highly desirable that the monomers and solvents employed be of sufficiently high purity that catalyst deactivation does not occur. Any suitable technique for monomer purification such as devolitilization at reduced pressures, contacting with molecular sieves or high surface area alumina, deaeration, etc. may be employed.

Purification of the resulting polymer to remove entrained catalyst may also be desired by the practitioner. Entrained catalyst may generally be identified by residues of ash on pyrolysis of the polymer that are attributable to aluminum and titanium values. A suitable technique for removing such compounds is by solvent extraction, e.g. extraction utilizing hot, high boiling chlorinated solvents, followed by filtration.

Having described the invention, the following example is provided as further illustrative and is not to be construed as limiting.

EXAMPLE 1

In a nitrogen atmosphere glovebox, a dry 2 oz (59 ml) bottle is charged with 32 ml of ISOPAR-E ™ (hereinafter IPE), a solution of polymethylaluminoxane (0.325 g., 5.6 mmole, in 7.2 ml IPE), and 220 μl, 22.4 μmole, of a 0.051M toluene solution of cyclopentadienyltitanium trisphenoxide (formed by the reaction of cyclopentadienyl titanium trichloride and phenol in a 1:3 molar ratio in the presence of an acid scavenger). The molar ratio of styrene:Al:Ti.is 6,000:500:1. The resulting solution is then stirred at room temperature for 30 seconds and is then treated with purified, deaerated styrene (7.0 g., 67.3 mmole). The bottle is then sealed with a sure seal cap which is then sealed again with electrical tape and the thus sealed container is placed in a shaker/hot water bath which is maintained at a temperature of 51° C. for 20 hours. The reaction mixture is then hydrolyzed with the addition of 20 ml of methanol, and slurried in 50 ml of 1N aqueous HCl for 5 minutes. The water is then removed with the use of a separatory funnel. The resultant polystyrene is collected by filtration, washed with methanol and vacuum dried at 110° C. for 24 hours. The yield is 6.78 g (97%). The resultant polystyrene has a melting point of 246° C., >95% syndiotacticity by $C^{13}$ analysis, and has a weight average molecular weight (Mw) as determined by gel permeation chromatography utilizing atactic polystyrene standards of 166,400. Number average molecular weight (Mn) determined similarly is 50,600.

EXAMPLES 2-13

The reaction conditions of Example 1 are complexes, solvents, ratios and reaction temperatures of Table I are employed. Results are contained in Table I.

TABLE I

| Ex | Complex | Ratio styrene:Al:Ti | solvent | % styrene[6] | temp °C. | time hr. | yield % | % syndiotactic | Mw ×10³ | melt pt. °C. |
|---|---|---|---|---|---|---|---|---|---|---|
| 2 | CpTTP[1] | 6,000:500:1 | IPE[5] | 5 | 51 | 2.5 | 56.5 | 88 | 60.6 | 249 |
| 3 | " | 18,000:500:1 | " | 20 | " | " | 60.3 | >95 | 145 | 250 |
| 4 | " | 6,000:500:1 | toluene | 40 | " | " | 93.6 | 84 | 60.6 | 253 |
| 5 | " | " | IPE[5] | 20 | " | " | 82.1 | >94 | — | 250 |
| 6 | CpTTE[2] | " | " | " | 25 | " | 67.4 | 91 | 123 | 251 |
| 7 | " | " | " | " | 51 | " | 91.1 | — | 86.4 | 251 |
| 8 | ITTA[3] | 6,000:1,000:1 | " | 40 | 50 | 20 | 86.2 | >95 | 160 | 263 |
| 9 | CpTTA[4] | 6,000:500:1 | " | " | 51 | 2.5 | 71.7 | >84 | — | 255 |
| 10 | CpTTP[1] | 6,000:125:1 | IPE[5] | 20 | 51 | 20 | 74.7 | 95 | 98.1 | — |
| 11 | CpTTP[1] | 6,000:500:1 | IPE[5] | 20 | 51 | 2.25 | 96.7 | 93 | 180.9 | 250 |
| 12 | PCpTTP[7] | " | " | " | " | " | 95.1 | — | — | 268 |
| 13 | CpTPDC[8] | " | " | " | " | " | 53.3 | — | — | 254 |

[1] cyclopentadienyltitanium tris(phenoxide)
[2] cyclopentadienyltitanium tris(ethoxide)
[3] indenyltitanium tris(dimethylamide)
[4] cyclopentadienyltitanium tris(dimethylamide)
[5] Isopar-E ™
[6] Weight percent of reaction mixture
[7] pentamethylcyclopentadienyltitanium tris(phenoxide)
[8] cyclopentadienyltitanium phenoxy dichloride

What is claimed is:

1. A process for preparing polymers of vinyl aromatic monomers having a high degree of syndiotacticity comprising contacting one or more vinyl aromatic monomers under polymerization conditions with a catalytically effective amount of a catalyst comprising the reaction product of polymethylaluminoxane and a complex corresponding to the formula: $CpTiX_3$, wherein Cp is a n-bonded cyclopentadienyl group, a ring fused derivative thereof or a substituted derivative of the foregoing wherein the substituents are selected from the group consisting of alkyl, aryl and silyl substituents containing up to 18 carbons, and X is independently each occurrence halide, OR, or $NR_2$, wherein R is independently each occurrence an aliphatic, cycloaliphatic or aromatic hydrocarbon group having from 1 to about 12 carbon atoms and provided further that in at least one occurrence X is OR or $NR_2$.

2. A process according to claim 1, wherein the polymethylaluminoxane and titanium complex are employed in quantities which provide an atomic ratio of Al:Ti of from about 50:1 to about 10,000:1.

3. A process according to claim 1, wherein the polymethylaluminoxane and titanium complex are employed in quantities which provide an atomic ratio of Al:Ti of from about 100:1 to about 1000:1.

4. A process according to claim 1, wherein the monomer is contacted with the catalyst at a temperature from about 25° C. to about 100° C.

5. A process according to claim 1, wherein an inert diluent is additionally present.

6. A process according to claim 1, wherein the polymer has a molecular structure containing greater than about 70 percent syndiotactic.

7. A process according to claim 1, wherein X is OR in each occurrence and R is selected from the group consisting of phenyl and $C_{1-6}$ alkyl.

* * * * *